United States Patent [19]

Schrock

[11] 4,314,581

[45] Feb. 9, 1982

[54] ROTARY VALVE WASHERLESS CARTRIDGE

[75] Inventor: Donald C. Schrock, Bay Village, Ohio

[73] Assignee: Streamway Corporation, Westlake, Ohio

[21] Appl. No.: 86,473

[22] Filed: Oct. 19, 1979

[51] Int. Cl.³ .......................................... F16K 25/00
[52] U.S. Cl. ........................ 137/454.5; 137/625.32; 251/175
[58] Field of Search ............ 137/454.5, 454.6, 625.32; 251/175

[56] References Cited

U.S. PATENT DOCUMENTS

| | | | |
|---|---|---|---|
| 1,971,186 | 8/1934 | Kornas | 251/360 X |
| 3,082,786 | 3/1963 | McLean | 137/454.5 |
| 3,241,810 | 3/1966 | Keller | 137/454.6 X |
| 3,475,002 | 10/1969 | Phillips | 251/175 X |
| 3,529,621 | 9/1970 | Christiansen | 251/175 X |
| 3,814,120 | 6/1974 | Moen | 137/454.6 X |
| 3,915,428 | 10/1975 | Hay | 251/175 |

FOREIGN PATENT DOCUMENTS 2343177  9/1977  France ............ 137/625.32

Primary Examiner—Harold W. Weakley
Attorney, Agent, or Firm—Pearne, Gordon, Sessions, McCoy & Granger

[57] ABSTRACT

A valve assembly embodied in cartridge form for ease of manufacture, repair, and replacement and for retrofitting existing valve housings. The cartridge operates with shear on/off operation and includes a valve element having elastomeric properties and a configuration arranged to develop positive shut-off and seal action to prevent leakage in both the flow circuit and along an operating stem.

1 Claim, 4 Drawing Figures

ROTARY VALVE WASHERLESS CARTRIDGE

BACKGROUND OF THE INVENTION

The invention relates to valve assemblies, and in particular, to a washerless-type assembly adapted for dispensing service water and other similar duties.

PRIOR ART

In residential plumbing and like applications, water faucets commonly employ so-called washer-type valves in which a rubber or plastic washer is compressed against an annular seat in the manner of a poppet to control flow of fluid. While relatively simple and economical in construction, this washer-type design is often characterized by operational limitations and relatively short service life. Many problems have been identified with the function and limitations of the washer itself. Even when in good order, such valves ordinarily require an increase in operating torque to adequately close them over that required to initially restrict them from a fully open condition. Unintentional, but commonly experienced, overtightening of the washer leads to premature failure. Where the seat is a permanent part of the valve body and the washer is allowed to deteriorate or disintegrate to a significant degree, consequent mechanical damage or erosion of the seat can necessitate replacement of the entire valve.

These recognized disadvantages of the conventional washer-type valve have lead to the development of washerless valves. In many cases, however, washerless valves when compared to the compression or washer-type have been relatively expensive to manufacture. Higher costs have resulted because of increases in the number of valve parts and complexities in individual parts and their assembly. In most cases, proposed washerless valve designs have required special valve bodies and have, therefore, necessitated new tooling, inventory, and related costs.

U.S. Pat. No. 2,967,042 to H. M. Richter discloses a stop valve having a relatively resilient plastic stem with a cupped valve structure.

SUMMARY OF THE INVENTION

The invention provides a valve assembly having a sheartype operation developed by the rotation of a stem and resulting movement of its associated porting means across a plane of stationary cooperating discharge porting in a surrounding body. Manipulation of a stem selectively effects on/off and modulated flow control as a function of the degree of registration of the ports at the plane of shear.

In accordance with the invention, the stem includes a resilient cupped valving element which is responsive to fluid pressures supplied to the valve to provide positive shutoff action in direct relation to the supply pressure. The stem cup valve element is arranged to positively seal against stem leakage, as well as for its primary function of controlling discharge flow.

As disclosed, the valve unit is adapted to take the form of a removable cartridge containing both the stationary port, or seat, and the removable valve stem. The disclosed cartridge is readily adapted for use in existing valve housings so that present tooling and product lines can be retained. Still further, the cartridge can be used to retrofit previously installed valve units of the older compression washer-type, and this conversion can be accomplished even without temporary disconnection of the valve from its service connections.

The illustrated valve assembly requires only a quarter turn to change from full "off" to full "on" flow. Positive stops are integrated into the valve parts so that the user is afforded a clear indication of the state of the valve and the extreme positions of the stem always have the same angular orientation. The valve is constructed in such a way that, by virtue of its shear action between valving points, no judgment is necessary in determining the torque necessary to fully turn the valve to its "off" position and the risk of overtightening the valve is eliminated. The disclosed stem cup valving member operates in a surrounding bore with only a slight intentional radial interference so that a minimum of effort is necessary to manipulate the valve, frictional wear is substantially eliminated, and the tendency of the valving elements to gall or be scored by foreign particles is greatly reduced.

As the result of freedom from inadvertent overtightening and premature wear, the valve exhibits a relatively long maintenance-free service life. Where repair, inspection, or replacement is required, removal of the cartridge assembly can be simply accomplished with ordinary tools and without disturbing service connections of the valve housing. The cartridge with its removable seat can be completely replaced, or it can be simply rebuilt by providing a new stem unit. Since no close dimensional tolerances are required in the construction of the valve assembly, there is no difficulty in selecting dimensionally mated parts. The disclosed valve is adapted to be economically fabricated of plastic materials through injection molding techniques. The valve assembly incorporates only a limited number of parts, each of which does not require elaborate finishing operations or assembly techniques.

DESCRIPTION OF THE PREFERRED EMBODIMENT

Figure 1:
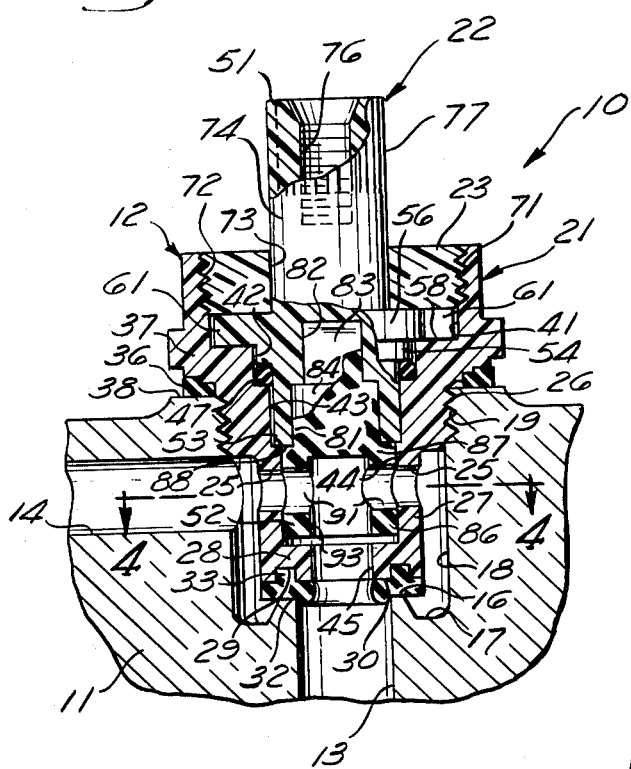
FIG. 1 is a cross sectional view of a cartridge assembly installed on a partially illustrated valve body.

Referring now to the drawing, a valve unit 10 comprises a valve body 11 and a cartridge assembly 12 mounted on the body. In the illustrated case, the valve body 11 is representative of a conventional type of faucet housing including a compression washer type. The valve body 11 is constructed of corrosion-resistant metal, such as brass or a suitable rigid plastic material. An inlet passage 13 formed in the body 11 is connected to a source of fluid, such as a water supply. The inlet passage 13 upstream of its illustrated portion is provided with mechanical threads or other means for coupling to a supply line in which a fluid is supplied under pressure. At a right angle to the inlet passage 13 is a fluid outlet or discharge passage 14. Downstream of the illustrated portion of the discharge passage 14 there is provided a suitable spout or equivalent outlet. The inlet passage 13 terminates at an annular seat 16 surrounded by a circular relief or depression 17. In a compression washer-type valve, the washer is compressed against a seat like the annular seat 16. A large cylindrical cavity 18 is axially aligned with the inlet passage 13, which is in the form of a cylindrical bore. The outlet 14 is radially oriented with respect to the cylindrical cavity 18 and communicates directly with it. An internally threaded end 19 of the cavity 18 forms an opening in the valve body 11.

Figure 3:
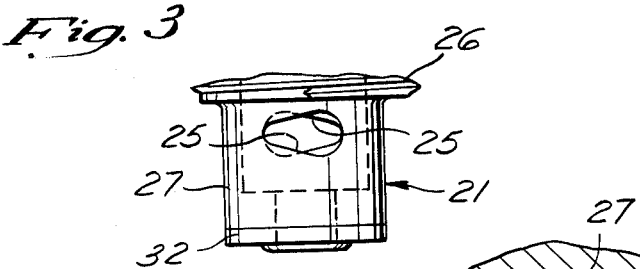
FIG. 3 is a fragmentary side view of an inner end of a stem element of the cartridge assembly.

The cartridge assembly 12 includes as its principal parts a bonnet 21, a stem 22, and a retaining ring 23. In the illustrated case, the bonnet 21 is a generally circular, hollow body having stepped diameters both at its inside and outside surfaces. The bonnet 21 is conveniently formed by injection molding of plastic material, such as acetal copolymer. At midlength, the bonnet 21 is externally threaded at 26 to enable it to be threaded into the internal threads 19 of the cavity 18. Inward of the external threads 26, the bonnet 21 has a cylindrical tubular wall portion 27 of reduced outside diameter somewhat smaller than that of the cavity 18. The tubular wall portion 27 is provided with diametrally opposed, pear-shaped ports 25 (FIG. 3). At its inward end, the bonnet 21 includes an inturned circular flange or end wall 28 having an annular groove 29 in its radial face 30. An annular seal 32 is fitted to this radial bonnet face 30 by positioning an integral annular projection 33 into the annular face groove 29. When the bonnet 21 is fully threaded into the valve body 11, the various elements are dimensioned such that the annular seal 32 is compressed to form a fluidtight barrier between the seat 16 and the lower radial face 30 of the bonnet.

An elastomeric annular seal 36 is captured between a radial shoulder 37 of the bonnet 21 and an annular face 38 of the valve body surrounding the threaded entrance 19 of the cavity 18 to prevent escape of fluid from the cavity along the threads 19, 26.

Figure 2:
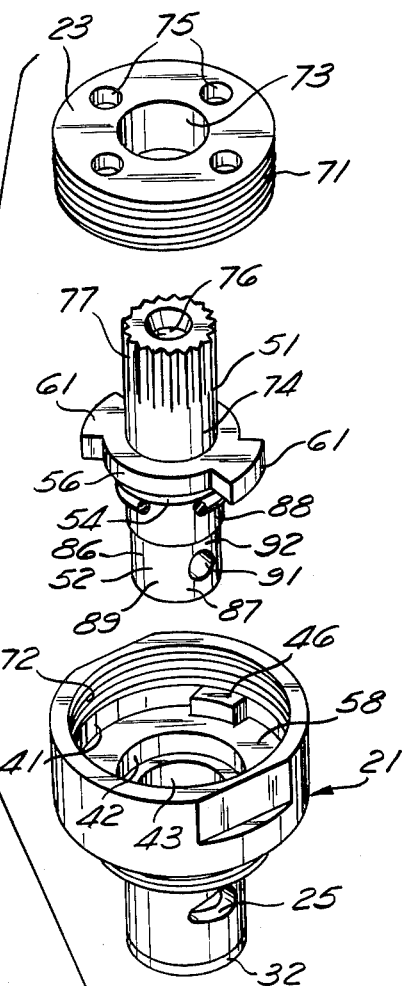
FIG. 2 is an axially exploded view of the cartridge assembly shown in FIG. 1.

The hollow bonnet 21 has a series of generally cylindrical counterbores 41-44, inclusive, from the outer towards the inner end of the bonnet, respectively. The outermost counterbore 41 is interrupted by a pair of diametrically opposed lugs 46 (only one is shown in FIG. 2) which extend radially inwardly of the cylindrical surface of this counterbore. A second counterbore 42 is dimensioned to receive an O-ring 47 which surrounds and forms an auxiliary seal for the stem 22.

Inward of the O-ring receiving counterbore 42, the bonnet 21 is formed with two smooth wall, cylindrical counterbores 43,44, the inner one 44 being slightly smaller than the other 43. At a lower end of the bonnet, an innermost bore 45 provides communication between the inlet passage 13 and the relatively large main bonnet bore 43.

The stem 22 is a subassembly of a generally circular, rigid outer portion 51 and a generally circular, resilient inner portion 52. An inner end 53 of the rigid stem portion 51 has a diameter slightly smaller than the corresponding diameter of the bonnet bore 43 (e.g., a nominal stem diameter of approximately 0.430 inch, and a nominal bonnet bore of approximately 0.458 inch) to support the stem for relatively free rotation about its axis within the bonnet. At midlength, the rigid stem portion 51 includes an annular lip or shoulder 54 which, with the O-ring 47 in the bonnet counterbore 42, constrains the O-ring 47 to effectuate a fluid seal between the bonnet and stem at this point. Axially outward of this shoulder 54 on the rigid stem portion 51 is a circumferential flange 56 which is arranged to fit against a radial surface 58 in the bonnet to axially position the stem 22 in the bonnet by proper tightening of the retaining ring 23 against an outwardly facing side of this circumferential flange. Diametrically opposed lugs 61 from extensions of the circumferential flange 56 and are configured to cooperate with the bonnet lugs 46 to limit rotation of the stem 22 to a quarter turn, i.e., 90 degrees.

The retainer ring 23 is externally threaded at 71 for cooperation with complementary internal threads 72 in the first bonnet counterbore 41. The retainer ring 23 has a central bore 73 through which a head end 74 of the outer stem portion 51 extends with adequate clearance to permit free rotation therebetween. Blind holes 75 in the outer face of the retaining ring 23 permit the ring to be turned into and out of the bonnet with a spanner wrench, or other suitable tool, for assembly and disassembly of the various cartridge parts. The head end of the rigid outer stem portion 51 in internally threaded at 76 and keyed by a coarse knurl or other means 77 for assembly with a suitable handle in accordance with conventional practice to permit the stem to be conveniently manipulated by hand.

The cylindrical tubular wall portion 27 of the bonnet has a pair of diametrically opposed side ports 25. The side ports 25 are preferably pear-shaped in configuration and are oriented with their long dimensions running circumferentially of the cylindrical wall portion. As indicated in FIG. 3, the ports 25 are oriented with the base (wide end) of one port preceding in a circumferential direction the stem (narrow end) of the opposite port.

The rigid outer portion 51 of the stem 22 is preferably fabricated by injection molding a suitable platic. The inner end of the outer stem portion 51 is formed with an axial cylindrical bore 81 and a blind cavity 82 of square cross section. The inner resilient stem portion 52 is preferably injection-molded onto the outer stem portion 51. The outer stem 51, once formed, is used as an insert in a mold cavity for forming the inner resilient stem portion 52 during injection molding of the latter. If necessary, a chemical adhesive or bonding agent may be sprayed or otherwise applied to the cylindrical bore 81 and square cavity 82 prior to molding of the inner portion 52. The acircular cross section of the square bore 82 and the tight fit of a complementary formation 83 on the outer end of the resilient stem portion 52 provides an interlocking or torque-transmitting connection between the stem parts 51 and 52. The resilient stem portion 52 is preferably formed of elastomeric material, such as ethylene propylene, which is desirably internally lubricated by suitable commercial fillers and being relatively soft, with a hardness of, for example, 80 durometer. Axially inward of the square cross section 83 and an adjoining cylindrical formation 84, the resilient stem portion 52 is cup-shaped, opening in the direction of the inlet 13, and includes a generally cylindrical, hollow skirt zone 86 and an end wall 87 abutting a radial face 88 of the rigid stem portion 51. The length of the skirt 86 is dimensioned to fall slightly short of the inturned bonnet flange 28. The diameter of an outer surface 89 of the resilient stem cup 52 is dimensioned such that it, in a free state, has a minimal interference with the bonnet bore 44 and, by way of example, may have a nominal diameter of 0.423 inch, while the bore 44 has a nominal diameter of 0.416 inch.

A pair of diametrically opposed ports 91 are formed in the sidewall of the hollow cup skirt 86 at axial points in registration with the bonnet ports 25. These stem ports 91 are spaced from the stem cup end wall 87 to leave sidewall zone 92 intermediate these ports and the end wall, which ensures that a circumferentially continuous section of the sidewall exists axially outward of the ports. The stem ports 91 are angularly related to the stem and bonnet lugs 61, 46 in such a manner that in one extreme angular position of the stem, the stem ports are fully misaligned from the bonnet ports 25 (adjacent the small end of these ports) and in the opposite extreme angular position, the stem ports are in alignment with the large ends of the bonnet ports.

Figure 4:
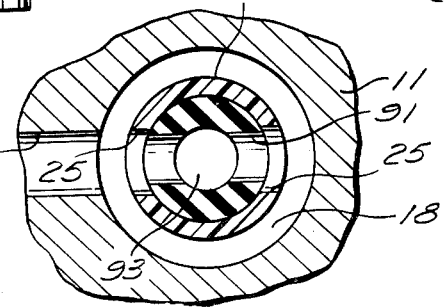
FIG. 4 is a fragmentary, cross sectional view taken in a plane transverse to the axis of the cartridge assembly as indicated in the line 4—4 of FIG. 1.

The valve assembly 10 is illustrated in a fully open condition in FIGS. 1 and 4. In this condition, fluid, such as service water, supplied to the passage 13 passes through the central aperture of the annular seal 32 and the axial bore 45 in the bonnet radial flange 28 into the cavity, designated 93, of the lower stem cup portion and out through each of the stem and bonnet ports 91 and 25 to the discharge passage 14.

When constructed in a conventional manner, the stem 22 is rotated clockwise to move the valve assembly 20 from the open to the closed position. In the closed position, the stem ports 91 face solid areas of the smooth, main bore 44 of the bonnet 21 so that flow is effectively closed through the stem. This closeoff of the stem ports 91 increases pressure in the stem cavity 93 by increasing the pressure drop from the valve inlet 13 to the outlet 14. A positive shutoff of flow is developed with this increasing pressure in the stem cup by resilient radial expansion of the cup sleeve, or sidewall, 86 and a resulting tight sealing engagement between the outer skirt surface 89 and the bonnet bore surface 44. Under these circumstances, the bonnet ports 25 are completely sealed by the skirt sidewall 86, which tightly engages the boundary or edges of these ports. Resilient radial expansion of the resilient cup-shaped stem 52 at its circumferentially continuous zone 92 above the ports 91 completely and positively seals against axial flow along the upper stem portion 51 during valve shutoff. It is important for the stem cup area 86 to seal against axial stem leakage when the valve is closed, since it is at this time pressures in the valve body 11 are ordinarily at their highest levels. At times when the valve is open, the auxiliary stem O-ring 37 provides an adequate seal.

It will be appreciated from the foregoing description that closing and opening action of the valve unit 10 employs a shearing action of the respective sealing surfaces formed by the stem skirt 86 and main bonnet bore 44. This shear action is accomplished across the cylindrical plane defined by the bonnet bore 44. Only a quarter turn of the stem 22 is required to change the condition of the valve unit from a full "on" to a full "off" state. The pear-shaped configuration of the bonnet side ports 25 allows relatively linearly increasing flow rates to be achieved when limiting rotation of the stem to a fraction of a full quarter turn. The quick quarter turn response of the valve unit is very desirable from the standpoint of the user, who, with simple wrist movement, can completely control the action of the valve without having to regrip a handle several times to effectuate a complete change from an open to a closed state. Further, the positive stopping action of the stem and bonnet lugs 61, 46 gives a sure indication to the user that the valve is in either a fully opened or closed condition. With the valve in an open state and pressure reduced within the stem cup cavity 93, frictional forces required to turn the stem 22 in the bonnet 21 are quite small, so that only a light touch need be given to the valve to manipulate the stem. Further, the minimal interference provided between the stem 22 and bonnet 21 in the area of the main bore and the absence of screw threads between the stem end valve bonnet result in a valve unit which is relatively free of frictional wear and, accordingly, has a long service life.

Although a preferred embodiment of this invention is illustrated, it should be understood that various modifications and rearrangements of parts may be resorted to without departing from the scope of the invention disclosed and claimed herein.

What is claimed is:

1. A valve assembly comprising a housing having a cavity including an annular seat adjacent an inner end of the cavity, an inlet passage communicating with the housing cavity through an area central of the annular seat, an outlet passage connected to the housing cavity, a cartridge assembly including a rigid hollow bonnet and a stem supported for rotation in the bonnet, the bonnet extending into the housing cavity, threaded means for securing the bonnet in the housing cavity, annular seal means at an inner end of the bonnet compressed by forces developed by said threaded means and sealing against the annular seat to isolate the inlet passage from the housing cavity, an inner portion of the bonnet forming a tubular wall including a circular bore, an outlet port extending radially through the tubular wall, means supporting said stem in an axially fixed position, an outer portion of said stem being exposed at an outer end of the bonnet to permit manual rotation thereof, an inner end portion of the stem being disposed in said circular bonnet bore, said inner stem portion being cup-shaped and opening in the direction of said annular seat, said inner stem portion being formed of a relatively soft, elastomeric material and including a radial port through a sidewall of the cup-shaped area, said radial stem port being in axial alignment with said bonnet outlet port and capable of being disposed in circumferential alignment or misalignment with said bonnet outlet port through selective rotation of said stem, said outer stem portion being formed of a material relatively more rigid than the material forming the inner stem portion, said inner and outer stem portions including means providing an interlocking torque transmitting connection therebetween, means for limiting rotation of the stem to substantially less than one full turn, an O-ring disposed in said bonnet about said stem axially outward of said inner cup-shaped stem portion to prevent leakage of fluid axially along said stem, said cup-shaped portion including a circumferentially continuous tubular zone axially outward of said stem port, an axially outer portion of said stem being relatively rigid, said cup-shaped portion having a free configuration providing a slight degree of interference with said circular bonnet bore, said cup-shaped portion being responsive to fluid pressure therein when said ports are misregistered to expand radially outwardly into tight sealing engagement with said bonnet bore to prevent radial fluid flow through said ports and axial leakage along said stem.

* * * * *